United States Patent
Gheva et al.

(10) Patent No.: US 10,585,771 B1
(45) Date of Patent: Mar. 10, 2020

(54) PLUGGABLE HARDWARE SIMULATION TEST EXECUTION SYSTEM

(71) Applicant: Amazon Technologies, Inc., Seattle, WA (US)

(72) Inventors: Yair E. Gheva, Seattle, WA (US); Sandy Hefftz, Tel Aviv (IL); Ethan Fitzgerald John, Seattle, WA (US); Michael Rolnik, Geva Binyamin (IL); Leon Robert Warman, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 212 days.

(21) Appl. No.: 15/677,963

(22) Filed: Aug. 15, 2017

(51) Int. Cl.
*G06F 11/00* (2006.01)
*G06F 11/22* (2006.01)
*G06F 11/34* (2006.01)
*G06F 17/50* (2006.01)

(52) U.S. Cl.
CPC ........ *G06F 11/2221* (2013.01); *G06F 11/221* (2013.01); *G06F 11/3409* (2013.01); *G06F 17/5009* (2013.01); *G06F 2201/865* (2013.01)

(58) Field of Classification Search
CPC ............... G06F 11/2221; G06F 11/221; G06F 11/3409; G06F 11/2247; G06F 11/261; G06F 11/26; G06F 11/263; G06F 11/3457; G06F 17/5009; G06F 2201/865
See application file for complete search history.

(56) References Cited

U.S. PATENT DOCUMENTS

| | | | | |
|---|---|---|---|---|
| 7,490,032 | B1 * | 2/2009 | Koh | G06F 17/5009 703/22 |
| 2005/0034102 | A1 * | 2/2005 | Peck | G06F 11/3648 717/124 |
| 2005/0165597 | A1 * | 7/2005 | Nightingale | G06F 11/3672 703/27 |
| 2017/0264485 | A1 * | 9/2017 | Papleux | H04L 41/0806 |
| 2018/0285134 | A1 * | 10/2018 | Hotra | G06F 9/4812 |

* cited by examiner

*Primary Examiner* — Joseph D Manoskey
(74) *Attorney, Agent, or Firm* — Lee & Hayes, P.C.

(57) ABSTRACT

A system may implement a flexible architecture to allow designers and testers to use a single flexible system for testing during a transition from a computer simulated model to a physical working prototype via a bus (or protocol). As hardware components become available, the system may be updated to enable replacing a simulated component with a physical hardware component while continuing to leverage at least some existing parts of the system (e.g., software and/or hardware components including simulation). The system may use customizable application program interfaces (APIs) to interface with the different components, simulated or physical. The APIs may enable components to be "plugged in" to the system to create a different configuration. In some embodiments, API's and/or other simulation data may be stored in a library to enable reuse or modifications at different times.

20 Claims, 8 Drawing Sheets

PLUGGABLE HARDWARE SIMULATION TEST EXECUTION SYSTEM

BACKGROUND

During product development, it is common to use software simulation during a portion of product development of certain products, such as electronic hardware. For example, software may be used to create a proof of concept and test some operational characteristics of a proposed electronic device during product development. Often, after software simulation is performed, a working prototype is created that is different than and separate from the software simulation, but is often developed using information learned from the software simulation. In effect, the software simulation and the working prototype stages are separate and distinct stages which are independently designed and rely on different resources. Thus, as currently performed, software simulation and creation of a working prototype share no efficiencies and do not easily accommodate an intermediary stage that incorporates elements of both the software simulation and the working prototype.

In product testing, it can be helpful to test differences in performance of different configurations. For example, a test may be created to measure differences in battery performance of different versions of an electronic device. Such a test may be simple when performed on a software simulation or when performed on a working prototype. However, this type of product testing is not conducive to hybrid systems that may attempt to compare performance of a component implemented in a software simulation to performance of the actual physical component while keeping other components and factors constant between tests because software simulation and working prototypes are typically separate and distinct stages which are independently designed and rely on different resources.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
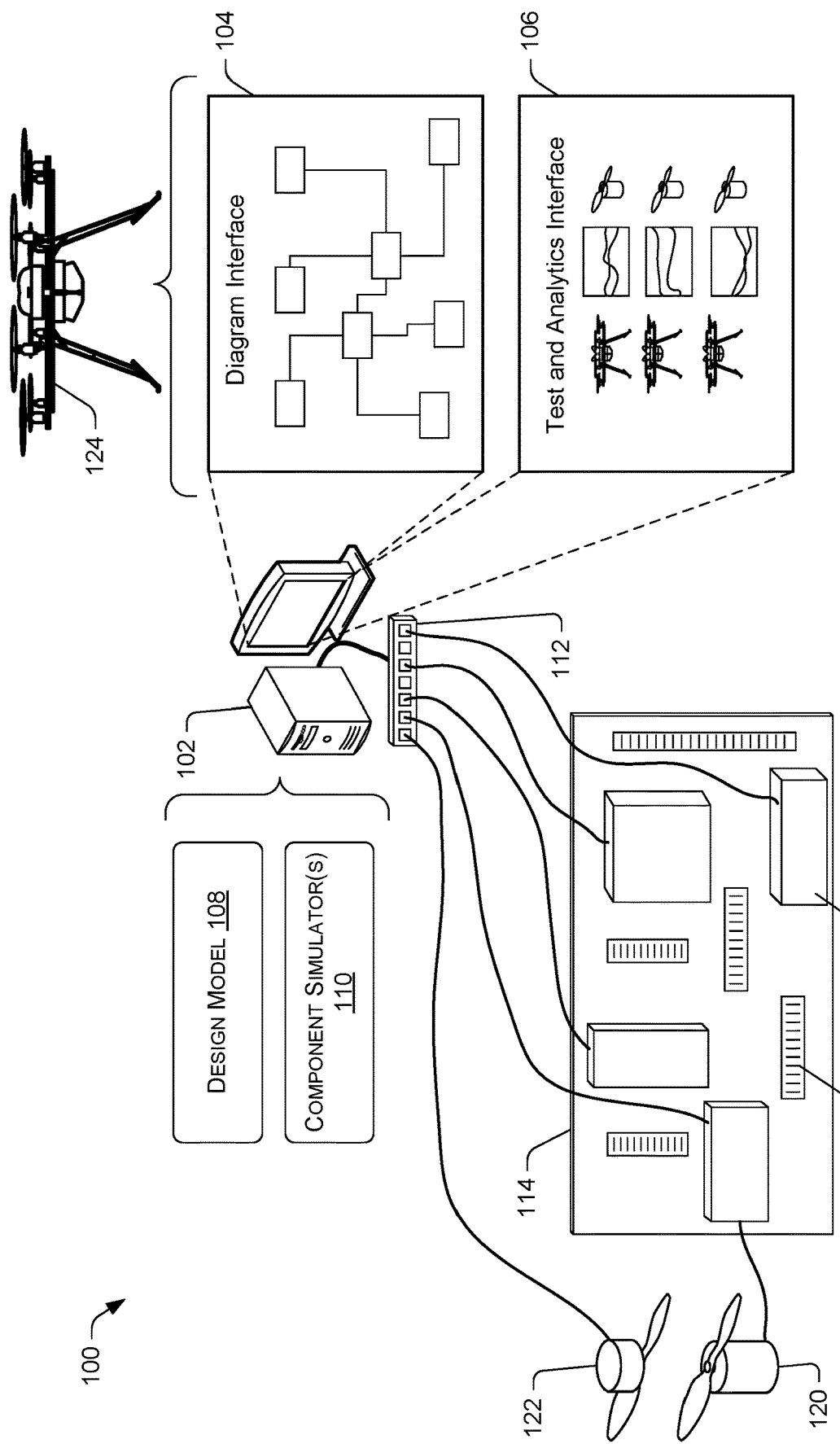
FIG. 1 is a schematic diagram of an illustrative environment configured to provide a pluggable hardware simulation test execution.

This disclosure is directed to a pluggable hardware simulation test execution system that may be configured as a hybrid system that includes at least one simulated hardware component that is simulated in software (referred to as a "component simulator") operable with at least one physical hardware component via a bus. The hybrid system may enable swapping out simulated hardware with actual hardware as actual hardware is selected, designed, and/or becomes available. By making incremental changes to the hybrid system, the hybrid system may accommodate product testing that isolates differences between performance of a simulated hardware component designed to use software to simulate a physical component and performance of the actual physical component while keeping other factors constant or nearly constant.

In accordance with one or more embodiments, the illustrative system may implement a flexible architecture to allow designers and testers to use a single flexible system for testing during a transition from a computer simulated model to a physical working prototype via a bus (or protocol). As hardware components become available, the system may be updated to enable replacing a simulated component with a physical hardware component while continuing to leverage at least some existing parts of the system (e.g., software and/or hardware components including simulation). The system may use customizable application program interfaces (APIs) to interface with the different components, simulated or physical. The APIs may enable a tester to define timing information, input/output formats and data locations, and other interoperability information, including data structures, to enable components to be "plugged in" to the system to create a different configuration. In some embodiments, API's and/or other simulation data may be stored in a library to enable reuse or modifications at different times.

The bus may be simulated as a protocol or may be implemented as a physical bus implemented in hardware. In some instances, the bus may be implemented as a controller area network (CAN) bus, an Ethernet bus, or other physical bus that may be used in a vehicle. The bus may enable physical hardware to be plugged into the bus via connectors or otherwise coupled to the bus to enable interoperability with the bus. In some embodiments, a computing device, such as a personal computer or remote computing device, may be plugged in to the bus or otherwise in communication with the bus, possibly via wireless connectivity or via another network. A computing device may use a generic network interface to enable connectivity with the bus and/or other hardware components, such as when the bus is simulated via a protocol. The generic network interface may use connectors, such as universal serial bus (USB) connectors and/or other equivalents to enable connection and communication with different physical hardware components.

The system may use visualization software to enable users to design a functional diagram of the system. The visualization software may enable a user to select components, define relationships between the components, set operational parameters for the components, and/or perform other tasks to define a working model.

In various embodiments, a testing computing device may be in communication with the system to enable providing test protocols and/or collecting test data, such as from various sensors configured with or proximate to physical components. For example, a testing computing device may input navigational information for use during tests and a sensor may collect wind speed generated by a rotor coupled to and under control of the system during the tests.

The techniques, apparatuses, and systems described herein may be implemented in a number of ways. Example implementations are provided below with reference to the following figures.

FIG. 1 is a schematic diagram of an illustrative environment 100 configured to provide a pluggable hardware simulation test execution. The environment 100 may include a computing device 102, which may be a desktop computer, a laptop computer, a network device, or other computing device that can facilitate a hardware simulation test execution that may include a simulated software component, a physical hardware component, or both. In some embodiments, the computing device 102 may be a distributed computing device with one or more components located in different areas or having other divisions. The computing device 102 may be a virtual device operating as part of a larger computing device, such as via a cloud services device. The computing device 102 may be configured to create and execute a functional diagram interface 104 that incorporates user input to define parameters, relationships between components, and/or other information. In some embodiments, the computing device 102 may be configured to perform at least some testing operations and related analytics via a test and analytics interface 106 to measure performance of one or more configurations of the functional diagram, among other related tasks.

The computing device 102 may include a plurality of software components, which may include a design model 108 and one or more component simulator(s) 110. The design model 108 and/or the component simulator(s) 110 may be created, modified, or otherwise interacted with visually via the diagram interface 104.

The design model 108 may include selected components of a system, relationships between those components, and/or other rules, parameters, I/O data, data formats, or other information about a model to be tested that may include at least one software simulated component and at least one physical hardware component. The design model 108 may enable selection and modification of application program interfaces (APIs) that enable interoperability of the various components, such as interoperability with a physical bus or other component. In some embodiments, the design model 108 may enable creation of new APIs, as well as use of existing APIs, possibly stored in a resource library. The components included in the design model 108 may include software simulated components, physical hardware components, or both. The design model 108 may also include a physical bus or protocol to simulate a bus.

The component simulator(s) 110 may include software simulators that simulate at least some actions of physical hardware. For example, for an unmanned aerial vehicle, the software simulated components may include a simulated motor controller, a simulated motor, a simulated navigational system, a simulated accelerometer, and/or other simulated components that may be implemented as hardware components in a final build of the product, such as a vehicle or other electronic device. The component simulator(s) 110 may include a protocol to simulate a network bus.

In some embodiments, the computing device 102 may include or be connected to a generic network interface 112. The generic network interface 112 may accept connectors, such as universal serial bus (USB) connectors and/or other equivalents to enable connection and communication with different physical hardware components, a physical bus, and/or test sensors and/or test equipment.

As shown in FIG. 1, the computing device 102 may be in communication with a bus 114, such as a CAN bus, Ethernet bus, or other physical bus. The bus 114 may include one or more ports 116, which may enable connection with one or more hardware components 118. In some embodiments, the bus 114 may be similar to a final production bus, but may include the ports 116 to enable plugging in different hardware components to the bus. The hardware components 118 may include physical hardware to be implemented with a vehicle, an electronic device, or other product. In some embodiments, the hardware components 118 may include hardware interfaces to enable connectivity to the computing device 102, which may provide I/O data to the bus via some hardware components. For example, a particular port on the bus 114 may be configured to interface with a navigation controller hardware components. When the navigation controller is simulated using one of the component simulators 110, then the port may be coupled, via a hardware component, to the computing device 102, which may provide navigation I/O data via the hardware component to that port. By providing simulated data in this way, the bus 114 may route the data to/from the port and enable operation as if the port were connected to a physical hardware version of the navigation controller. Later, during further testing, the port may be connected to a physical navigation controller. The bus 114 may perform the same operations with the physical navigation controller as with the navigation controller that was simulated using one of the component simulators 110. Thus, comparison testing may be performed on the system to isolate component performance of the different navigation controllers (simulate and physical) since only a single component has changed. In some embodiments, the change may require at least some modification to an API that enable interfacing with the hardware component, the bus 114, the computing device 102, and/or other components.

In various embodiments, one or more of the hardware components 118 may be actual physical hardware implemented in a final production product or similar to a final production product, possibly only different by inclusion of a plug or connection interface to couple to the bus 114. In some embodiments, one or more of the hardware components 118 may be coupled to or in communication with an actual physical hardware component 120 implemented in a final production product or similar to a final production product. For example, the physical hardware component 120 may be a motor (as shown in FIG. 1), an accelerometer, a sensor, or other component that may be implemented in a final production of a product.

The computing device 102 may include connectivity to test equipment 122, such as a sensor or other test equipment, as discussed above. For example, the test equipment 122 may include an airspeed sensor, a temperature sensor, a light sensor, an accelerometer, or other type of sensor that may measure physical properties. Examples of other test equipment may include a display screen to project test imagery used to simulate a test and viewable by an image sensor used by a vehicle. Of course, many other types of test equipment and/or sensors may be used with the computing device 102. The test equipment 122 may be connected to the computing device 102 via the generic network interface 112 and may be controlled by associated components, as discussed below. The test equipment 122 may be used to collect data used by the test and analytics interface 106.

Ultimately, the system described herein may be used to simulate a product 124, such as a vehicle, electronic device, or other product, which may be tested in different stages of development and in different iterations using different amounts or simulated software components and/or physical hardware components that interact with at least some common infrastructure (e.g., the computing device 102, etc.). The product may be an unmanned aerial vehicle or other type of product that may be developed for a large production cycles and may undergo testing for selection of different components.

Figure 2:
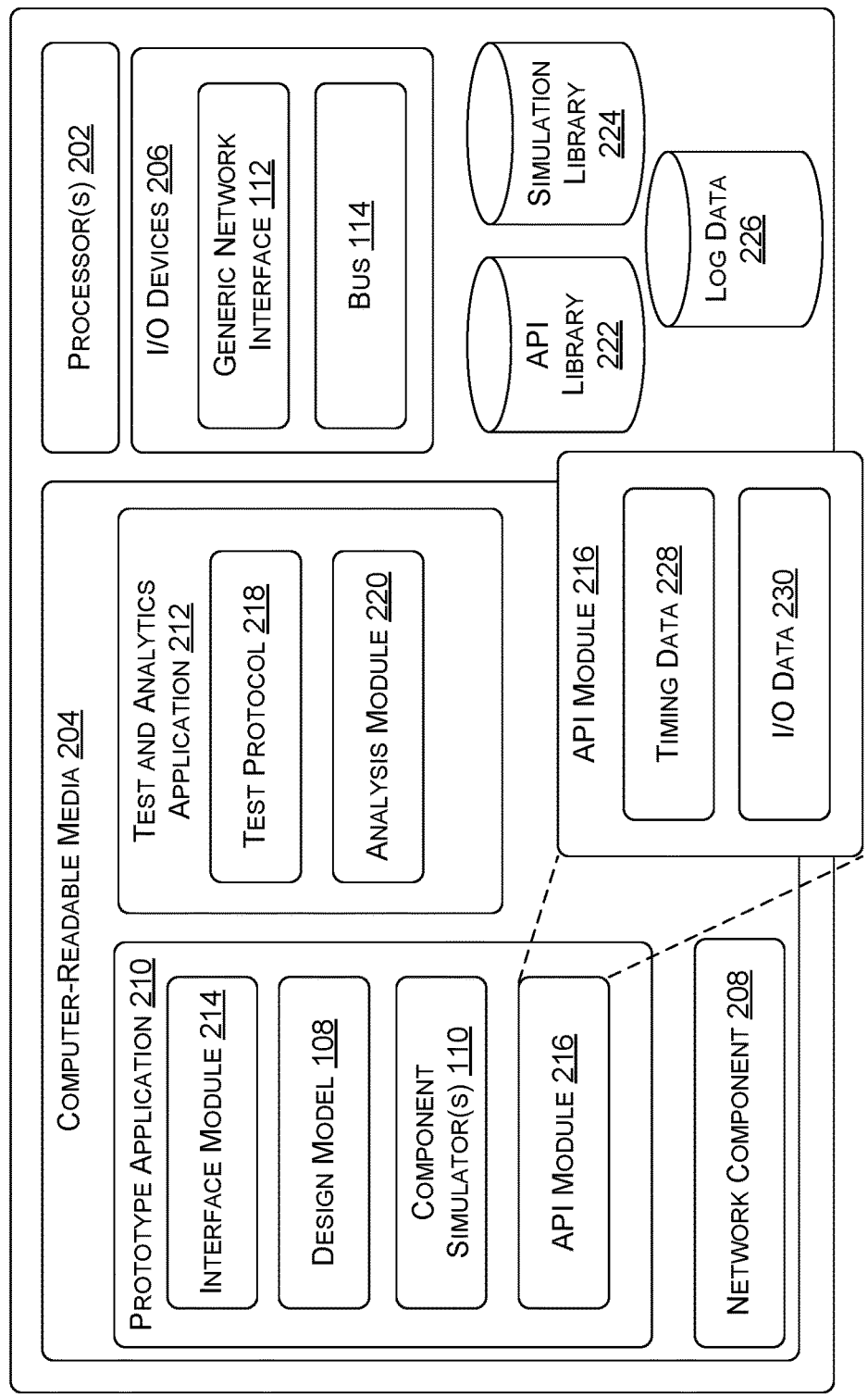
FIG. 2 is a block diagram of an illustrative computing architecture configured to provide a pluggable hardware simulation test execution.

FIG. 2 is a block diagram of an illustrative computing architecture 200 configured to provide a pluggable hardware simulation test execution. The computing architecture 200 may be representative of the computing device 102. The computing architecture 200 may be implemented in a distributed or non-distributed computing environment.

The computing architecture 200 may include one or more processors 202 and one or more computer readable media 204 that stores various modules, applications, components, programs, or other data. The computer-readable media 204 may include instructions that, when executed by the one or more processors 202, cause the processors to perform the operations described herein.

Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks.

The computing architecture 200 may include one or more input/output (I/O) devices 206. The I/O devices 206 may include the generic network device 112 and/or the bus 114. The computing architecture 200 may include a network component 208, which may enable connectivity with other computing devices via a wired network, a wireless network, or combinations thereof. For example, the network component 208 may enable a computing device to exchange information with a remote computing device that provides cloud computing services or other distributed computing services.

In some embodiments, the computer-readable media 204 may include a prototype application 210 to configure a pluggable hardware simulation test execution system and a test and analytics application 212 to test and perform analytics on the configured system generated by the prototype application 210. The prototype application may include an interface module 214, the design model 108, the component simulator(s) 110, and an API module 216. The test and analytics application 212 may include a test protocol 218 and an analysis module 220. The components may be stored together or in a distributed arrangement. The computing architecture 200 may also include or have access to an API library 222, a simulator library 224, and/or other libraries of data that may enable users to leverage existing data. The computing architecture 200 may also include log data 226, which may include data stored for analysis purposes. The log data 226 may include information captured by any of the various components and/or buses, as well as any test equipment. The log data 226 may be populated at least in part by the test protocol 218 and used by the analysis module 220.

The interface module 214 may generate a user interface, such as the diagram interface 104, configured to receive user input to define the design model 108, modify APIs, and/or provide other input to the system, possibly via a web interface or other access portal. The interface module 214 may also be configured to receive user input to inform the test and analytics application 212 as discussed herein. In various embodiments, the interface module 214 may enable a user or designer to select a configuration of components for use in a test, which may include component simulators, hardware components, and/or a combination at both. The changes may be made at or near runtime, and thus enable simple and efficient changes to the system for testing and other purposes.

As discussed above, the design model 108 may include selected components of a system, relationships between those components, and/or other rules, parameters, I/O data, data formats, or other information about a model to be tested that may include at least one software simulated component (via one of the component simulator(s) 110) and at least one physical hardware component. The design model 108 may enable selection and modification of APIs, possibly via the API library 222 and/or the API module 216. The APIs may enable interoperability of the various components, such as interoperability with a controller area network (CAN) bus, an Ethernet bus, or other physical bus, or other component. The components included in the design model 108 may include software simulated components, physical hardware components, or both. The design model 108 may also include a bus or protocol to simulate a bus, which may be one of the component simulator(s) 110.

The component simulator(s) 110 may include software simulators that simulate at least some actions of physical hardware. For example, for an unmanned aerial vehicle, the software simulated components may include a simulated motor controller, a simulated motor, a simulated navigational system, a simulated accelerometer, and/or other simulated components that may be implemented as hardware components in a final build of the product, such as a vehicle or other electronic device. To simulate a hardware component, a component simulator may output signals that mimic actual signals output by the hardware components. In some embodiments, the component simulator(s) 110 may replay data that is similar to data output by a hardware device, which may be recordings of data output by actual hardware devices. However, the component simulator(s) 110 may receive inputs, and the outputs may be based at least in part on the inputs. In this latter example, the component simulator(s) 110 may employ logic to receive inputs, process the inputs, and generate outputs based on the logic. The logic may be generated to mimic actual operation of a hardware component. The component simulator(s) 110 may include a protocol to simulate a network bus. In some embodiments, at least some of the component simulator(s) 110 may be stored and/or made available via the simulation library, which may enable reuse and/or leveraging existing data for at least some component simulators.

The API module 216 may control interaction between the various component simulator(s) 110 and/or with the I/O devices 206. For example, each component simulator may include an API to process data to/from the component simulator to enable interoperability in the system. The API module 216 may include timing data 228 and I/O data 230 (that may include formatting information). The timing data 228 may control timing of data outputs and initiation of actions by components, whether simulated or physical components. The I/O data 230 may include formatting data. The I/O data 230 may specify locations for input/output information, such as where to receive information, where to send information, and so forth. Information may be received from local devices, such as via the bus 114 and/or via remote locations, possibly via the network component 208. In some embodiments, the API module 216 may enable leveraging existing APIs from the API library 222, which may be modified or reused to perform an intended purpose. In various embodiments, the API module 216 may generate an API for a component, possibly via interaction with a user, such as by prompting a user to enter various parameters and/or other information to create the API to perform an intended purpose.

In some embodiments, the API module 216 may include various logic to perform operations that facilitate exchange of data between components via a physical bus or a simulated bus (e.g., software protocol). The API module 216 may generate first logic to initiate execution of a first component simulator that provides software simulation of a hardware component. The API module 216 may generate second logic to send output data from the first component simulator to a second component simulator as input to the second component simulator. The API module 216 may generate third logic to send the output data from the first component simulator to a physical hardware component that performs the same or similar function as the second component simulator. The API module 216 may also generate fourth logic to initiate execution of at least the second component simulator or the physical hardware component. The API module 216 may include further logic to control other component simulators and/o other hardware components. In some embodiments, the second logic may send the output data to the second component simulator or the physical hardware component using a physical bus or a simulated bus implemented using a software protocol. In various embodiments, an editor may enable receipt of input to modify parameters of the first logic, the second logic, the third logic, or the fourth logic. In various embodiments, at least one of the first logic or the second logic may define parameters of the output data, the parameters including at least timing information and a format of the output data.

The test protocol 218 may enable performing a test using a prototype facilitated by the prototype application 210. The test protocol may include a series of commands, operations, and/or data, which may be input into one or more of the component simulator(s) 110 or actual hardware components. The test protocol 218 may enable standardized testing, such as to facilitate repeatable testing processes, which can facilitate comparisons of different prototypes that have undergone a same testing sequence. The test protocol 218 may cause at least some data used by components to be stored as the log data 226. In some embodiments, the test protocol 218 may also store other data in the log data 226, such as data captured or created by the test equipment and/or other devices.

The analysis module 220 may perform analytics of the log data 226 generated via the test protocol 218. The analytics may isolate differences in operation of hardware and/or component simulators. For example, analytics may provide differences or similarities in operation of a product that compares a first version that includes a component simulator and a second version that replaces the component simulator with an actual hardware component while having few or no other differences. The analysis module 220 may be configured to create benchmark data and then measure subsequent performance to the benchmark data, for example.

Figure 3:
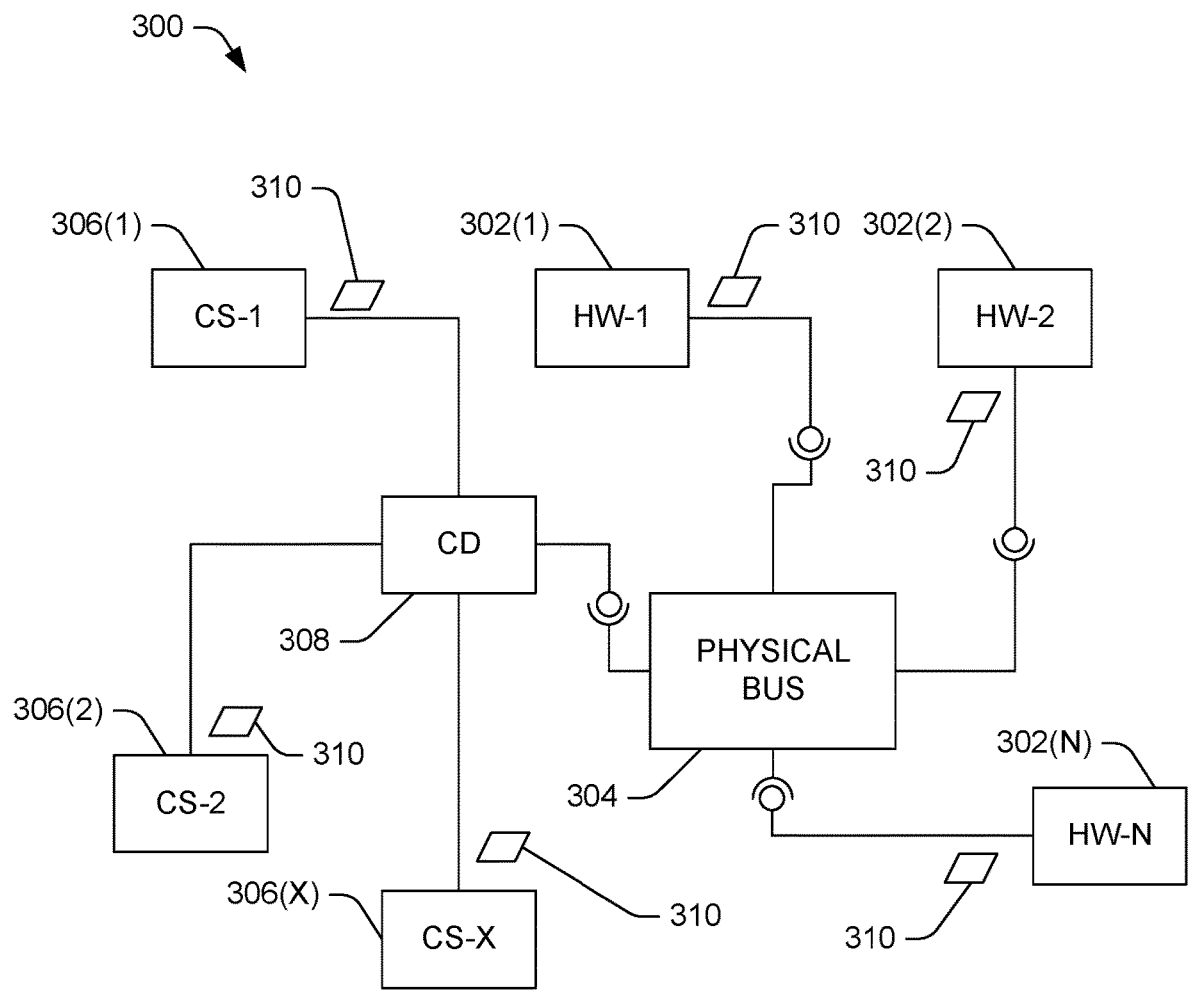
FIG. 3 is a block diagram of an illustrative functional diagram that includes at least one simulated component and at least one hardware component.

FIG. 3 is a block diagram of an illustrative functional diagram 300 that includes at least one simulated component and at least one hardware component. The functional diagram 300 may include various hardware components 302(1), 302(2), . . . 302(N) in communication with a physical bus 304. The physical bus may be a CAN bus, an Ethernet bus, or any other type of physical bus that facilitates communication between different components. Examples of hardware components in a vehicle may include a navigational controller, a motor, an accelerometer, a speed controller, and/or other types of hardware components.

The functional diagram 300 may include various component simulators 306(1), 306(2), . . . 306(X), which may be executed by a computing device and/or provide data via the computing device 308. The component simulators may simulate operation using executable logic that processes inputs and generate outputs representative of hardware components when a physical version of the hardware component is not available for use in the system or is undesirable for other reasons, such as for testing of different scenarios. For example, it may be desirable to use a simulated navigation controller to test different navigational scenarios. The computing device 308 may be in communication with the CAN bus 304. As a whole, the functional diagram 300 may provide a visualization of components and various relationships between components.

The functional diagram 300 may be created and/or manipulated via the interface module 214 to enable a user to define the relationships, data structures, parameters, and/or other data for simulated components as well as hardware components used in a prototype. The CAN bus 304 and hardware components 302(1)-(N) may depict actual hardware whereas the component simulators 306(1)-(X) may depict software that interfaces with at least some hardware or with other software. In some embodiments, the functional diagram 300 may represent all software simulators without any hardware components, or vice versa, as a prototype transitions from early design stages that are predominately prototyped via software to later design stages that are predominately prototyped using physical hardware components.

The functional diagram 300 may enable access to various APIs 310 that correspond to various components to provide interoperability between various components and/or with the CAN bus. The APIs may define data formats, timing information, I/O data, and/or may otherwise modify or process data from respective components to enable interoperability with other components or with the CAN bus 304.

Figure 4:
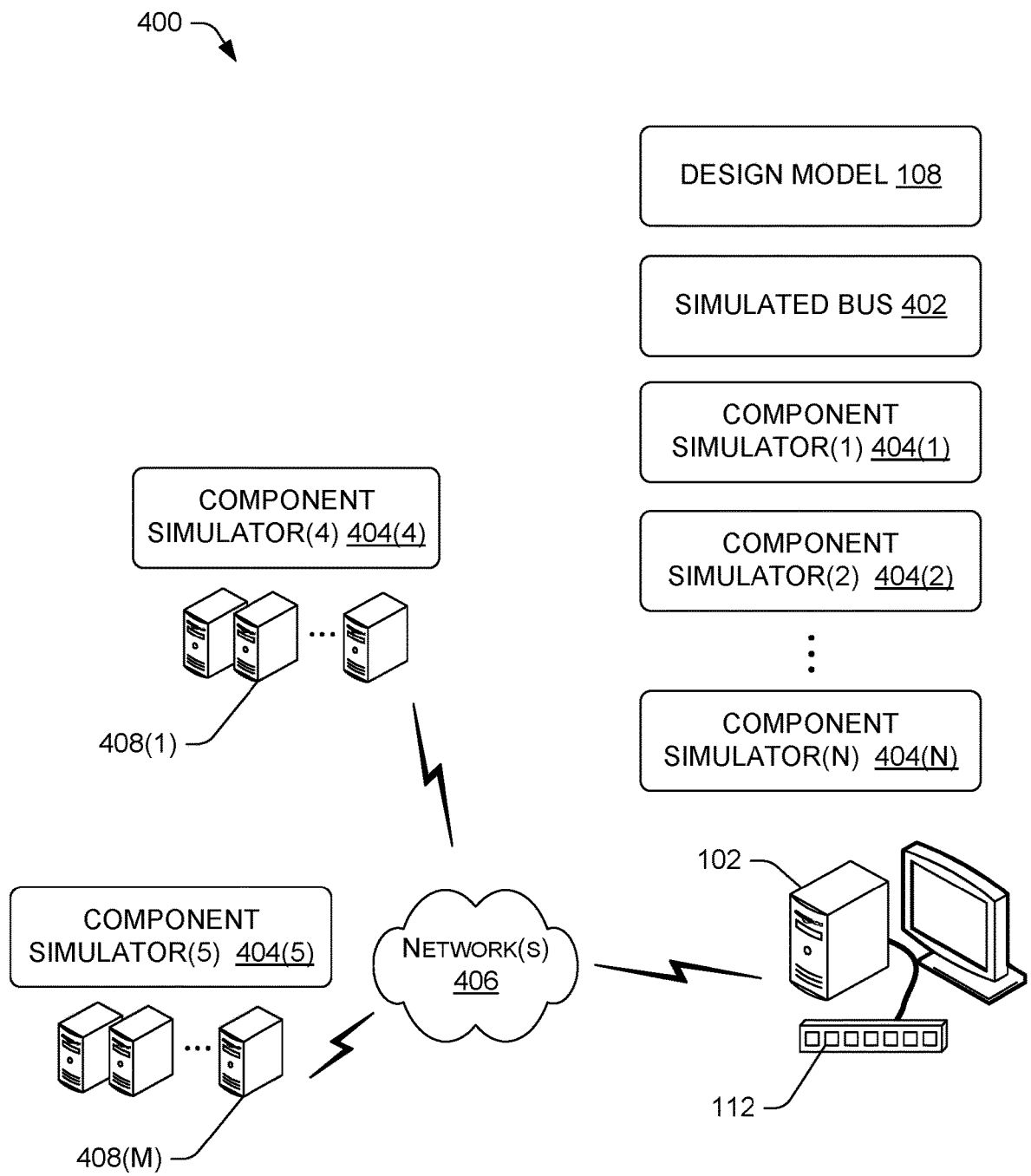
FIG. 4 is a schematic diagram of an illustrative system that includes simulated components operable via a simulated bus.

FIG. 4 is a schematic diagram of an illustrative system 400 that includes simulated components operable via a simulated bus. The system 400 may include the computing device 102 that includes the generic network interface 112 and various software to facilitate operation of a prototype of a product. The software may include the design model 108, a simulated bus 402, a first component simulator 404(1), a second component simulator 404(2), . . . and a last component simulator 404(N). The computing device 102 may exchange information via one or more networks 406 with one or more remote computing device 408(1)-408(M), which may execute other component simulators such as a fourth component simulator 404(4) and a fifth component simulator 404(5), respectively. The networks 406 may be wired networks, wireless networks, or a combination of both. The computing device 102 may exchange data with the remote computing device via the network component 208 shown in FIG. 2.

The system 400 represents an early prototype that relies on software simulation performed by various component simulators 404(1)-(N) that may exchange data with another component simulator and/or with the simulated bus 402 in accordance with the design model 108. The simulated bus 402 may be implemented as a protocol that mimics or simulates logic of a CAN bus, and thus facilitates communication between different component simulators. APIs may facilitate this communication. The APIs may be custom designed to enable the exchange of data and to control aspects such as timing (initiation, event timing, etc.), data formats, I/O data, and so forth. Users may leverage APIs from the API library 222 shown in FIG. 2, such as by retrieving an existing API and modifying the API to perform an intended purpose. In some embodiments, at least some APIs may be templates, which provide a generic structure to process certain type of data and enable efficient development of new APIs.

The system 400 may be modified to replace at least one component simulator with a hardware component to test operation of the hardware component. Such a modification is described next.

Figure 5:
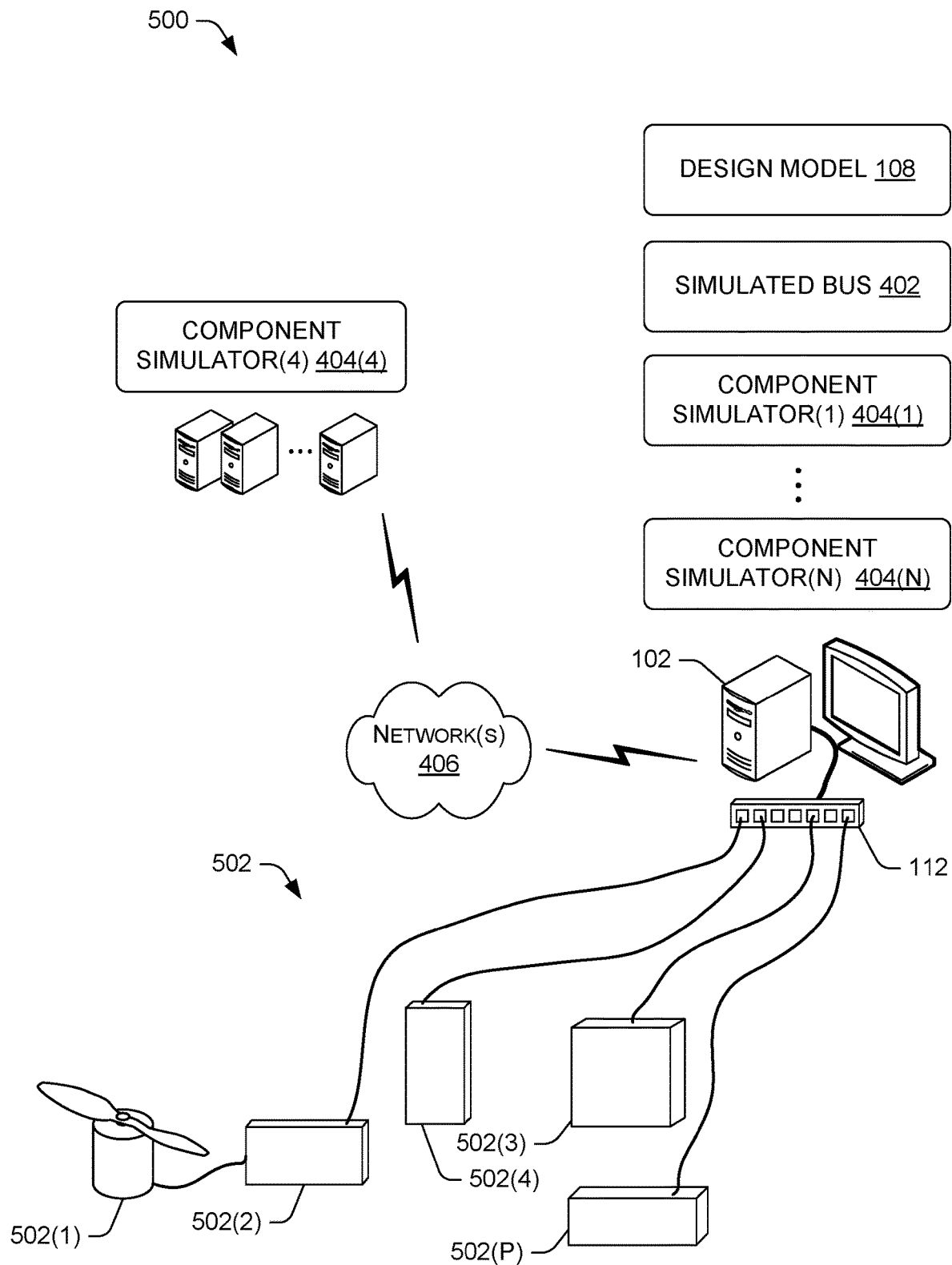
FIG. 5 is a schematic diagram of an illustrative system that includes simulated components and hardware components operable via a simulated bus.

FIG. 5 is a schematic diagram of an illustrative system 500 that includes simulated components and hardware components operable via a simulated bus. The system 500 may be a modification of the system 400 that includes additional hardware components.

The system 500 may include the computing device 102 that includes the generic network interface 112 and various software to facilitate operation of another prototype of the product. The software may include the design model 108, the simulated bus 402, the first component simulator 404(1), . . . and the last component simulator 404(N). The computing device 102 may exchange information via the network(s) 406 with at least the computing device 408(1), which may execute the fifth component simulator 404(5).

The system 500 represents a mid-level prototype that relies on at least some software simulation performed by various component simulators 404(1)-(N) to enable testing with one or more hardware components 502. The hardware component(s) 502 may interface, via the generic network interface 112, to provide data to the computing device 102 or from the computing device 102. The inputs/outputs may be routed via the simulated bus 402 executed by the computing device 102. The simulated bus 402 may be implemented as a protocol that mimics or simulates logic of a CAN bus, and thus facilitates communication between different component simulators and/or the hardware components. As described above, APIs may facilitate this communication. The APIs may be custom designed to enable the exchange of data and to control aspects such as timing (initiation, event timing, etc.), data formats, I/O data, and so forth for the component simulators 402(1)-(N) and/or for hardware component(s) 502.

As shown in FIG. 5, a first component 502(1) may provide data and/or signals to control a second component 502(2). For example the first component 502(1) may be an electronic speed controller that provides control signals to the second component 502(2), which may be a motor. The first component 502(1) may receive input data from the computing device 102, via the generic network interface 112, which may be generated by one or more of the component simulator(s) 404(1)-(N). For example, one component simulator may generate simulated navigational data or signals to simulate output of hardware navigational instrumentation while another component simulator may generate simulated accelerometer data or signals to simulate output of hardware accelerometer. Other hardware components, such as hardware components 502(3), . . . 502(P) may exchange information with the computing device 102, which may or may not be routed to the first component 502(1) via the simulated bus 402 depending on logic implemented by the simulated bus. APIs may control the data flow, format, timing, and input/output, as described above, for each component whether implemented as the component simulators and/or the hardware components 502.

The system 500 may be modified to replace at least one component simulator with a hardware component and/or to replace the simulated bus 402 with a physical bus to test operation of yet another prototype of the product. Such a modification is described next.

Figure 6:
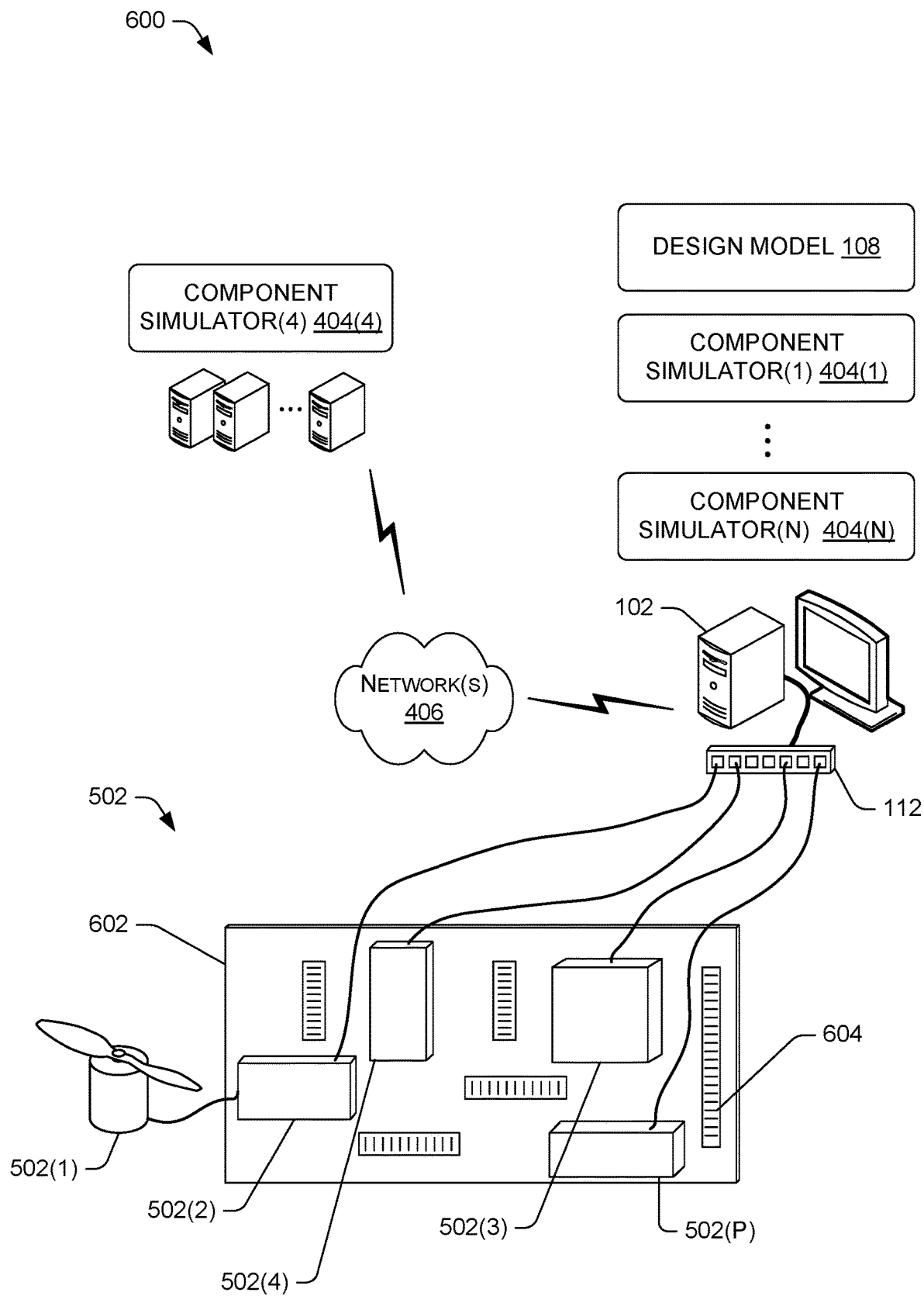
FIG. 6 is a schematic diagram of an illustrative system that includes simulated components and hardware components operable via a physical bus.

FIG. 6 is a schematic diagram of an illustrative system 600 that includes simulated components and hardware components operable via a physical bus. The system 600 may be a modification of the system 400 and/or the system 500 that includes additional hardware components and/or a physical bus.

The system 600 may include the computing device 102 that includes the generic network interface 112 and various software to facilitate operation of another prototype of the product. The software may include the design model 108, the first component simulator 404(1), . . . and the last component simulator 404(N). The computing device 102 may exchange information via the network(s) 406 with at least the computing device 408(1), which may execute the fifth component simulator 404(5). The computing device 102 may exchange data with a physical bus 602 via the generic network interface 112. The physical bus 602 may be a physical hardware version of the simulated bus 402 discussed above with reference to FIGS. 4 and 5. The bus physical 602 may include ports 604, which may enable coupling of at least some of the hardware components 502. In some embodiments, at least some hardware components may be integrated with the physical bus 602, such as when the physical bus 602 is implemented as part of a printed circuit board (PCB).

The system 600 represents a later-level prototype that may utilized at least some software simulation performed by various component simulators 404(1)-(N) to enable testing with one or more hardware components 502 coupled to the physical bus 602. The hardware component(s) 502 may interface with the physical bus 602, and via the generic network interface 112, to provide data to the computing device 102 or from the computing device 102. The inputs/outputs may be routed via the physical bus 602 that facilitates communication between different component simulators and/or the hardware components. As described above, APIs may facilitate this communication. The APIs may be custom designed to enable the exchange of data and to control aspects such as timing (initiation, event timing, etc.), data formats, I/O data, and so forth for the component simulators 402(1)-(N) and/or for hardware component(s) 502.

As shown in FIG. 6, the first component 502(1) may provide data and/or signals to control the second component 502(2) similar to the manner described above with reference to FIG. 5. For example the first component 502(1) may be an electronic speed controller that provides control signals to the second component 502(2), which may be a motor. The first component 502(1) may receive input data from the computing device 102, via the generic network interface 112, which may be generated by one or more of the component simulator(s) 404(1)-(N). For example, one component simulator may generate simulated navigational data or signals to simulate output of hardware navigational instrumentation while another component simulator may generate simulated accelerometer data or signals to simulate output of hardware accelerometer. Other hardware components, such as hardware components 502(3), . . . 502(P) may exchange information with the computing device 102, which may or may not be routed to the first component 502(1) via the physical bus 602 depending on logic implemented by the physical bus 602. APIs may control the data flow, format, timing, and input/output, as described above, for each component whether implemented as the component simulators and/or the hardware components 502.

The system 600 may be modified to replace at least one component simulator with a hardware component to test operation of yet another prototype of the product. Thus, further prototypes may continue to replace component simulators with actual hardware components until no further component simulators are used in the system. However, as discussed above, it may be advantageous to use one or more component simulators for repeatability testing, such as to gest specific scenarios which may be difficult, impractical, or impossible to test without simulation.

Figure 7:
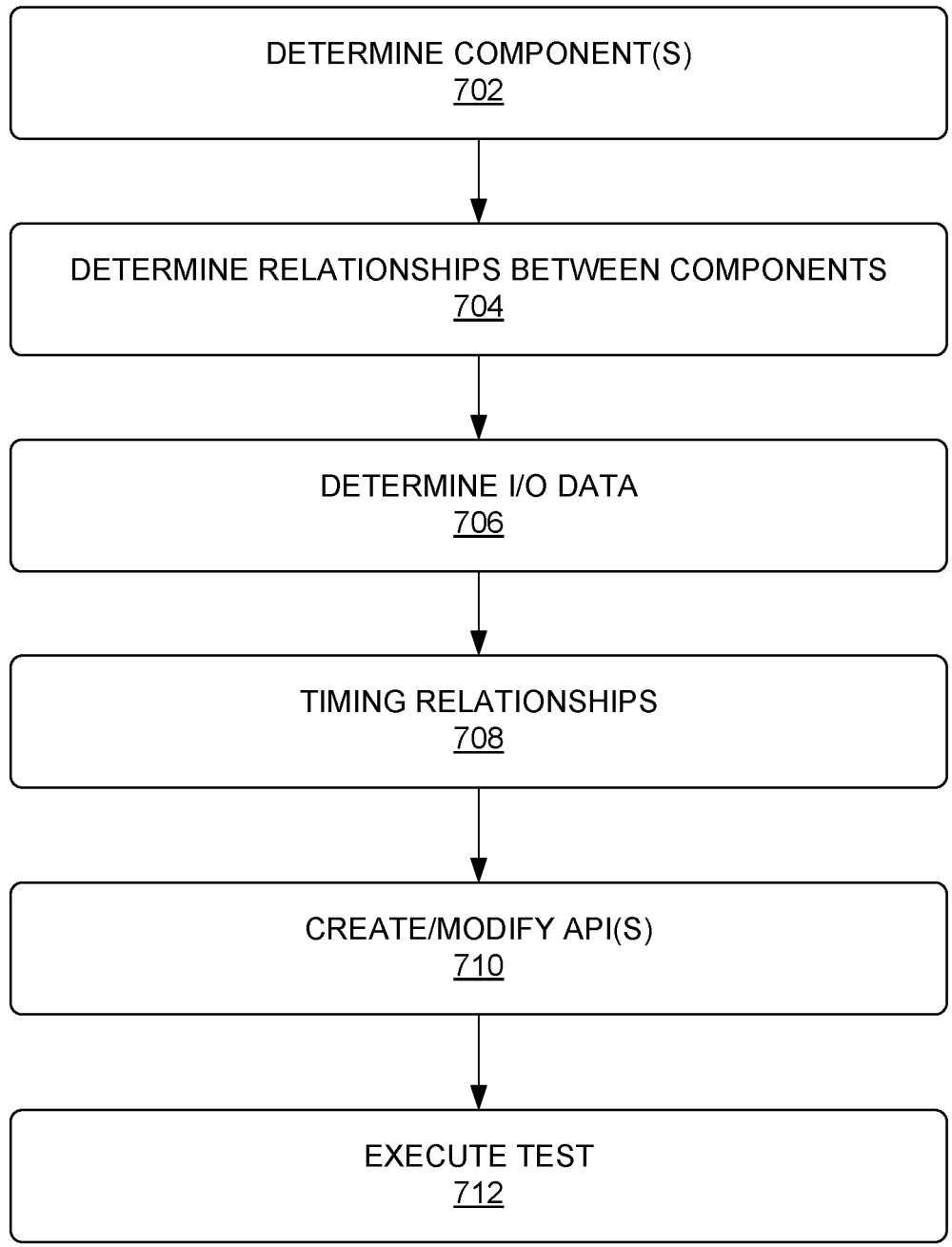
FIG. 7 is a flow diagram of an illustrative process to configure a pluggable hardware simulation test execution.
Figure 8:
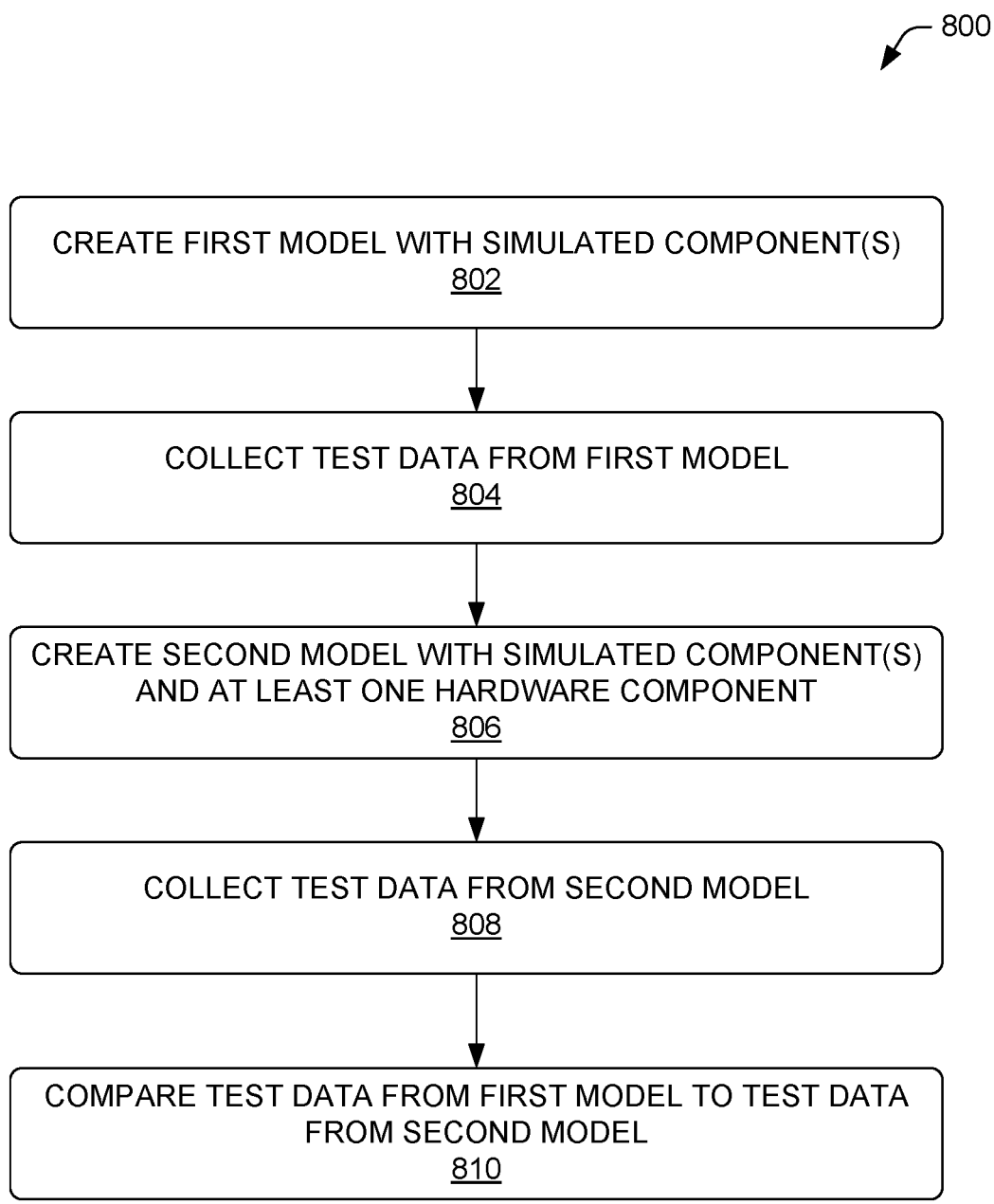
FIG. 8 is a flow diagram of an illustrative process to perform analytics from test data for different configuration of a pluggable hardware simulation test execution.

FIGS. 7 and 8 are flow diagrams of illustrative processes illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 7 is a flow diagram of an illustrative process 700 to configure a pluggable hardware simulation test execution. The process 700 is described with reference to the environment 100 and the computing architecture 200.

At 702, the prototype application 210 may determine components to be used in a system. For example, the interface module 214 may enable one or more users to define components that are included in a product, a vehicle, an electronic device, or another device. The components may be defined initially as generic objects, which may later be associated with component simulator(s) 110, actual hardware components, or both.

At 704, the prototype application 210 may determine relationships between the components determined at the operation 702. For example, the interface module 214 may enable one or more users to define the relationships between the components, such as by creating or adding relationships to the design model 108. The relationships may be formed via a unified modeling language (UML) to visually depict the relationships. As an example, a first component may be an electronic speed controller, a second component may be a motor, and a third component may be a navigation system. Each of these components may be related to at least one other component to enable operation of the motor in response to navigation information. In the example, above, the first component may be an intermediary between the second component and the third component, to enable signals from the navigation system to be translated into current to operation the motor via the electronic speed controller.

In some embodiments, at least the operations 702 and 704 may be used to inform or create the design model 108. Over time, additional components may be added, some components may be removed, and some components may be modified, possibly by replacing component simulator(s) 110 with actual hardware components as described herein.

At 706, the prototype application 210 may determine the input/output (I/O) data 230 for each component. The I/O data 230 may inform the API module 216, as discussed below. The I/O data 230 may determine a format of data used as inputs for a component as well as a format of data to be output by a component. The I/O data 230 may also include addresses of devices for inputs and/or outputs, which may be determined from and/or be associated with the relationships formed at the operation 704. In some embodiments, creation of the relationships at the operation 704 may be used to determine which components have I/O data 230 and parameters for the I/O data 230. In some embodiments, the I/O data 230 may also determine I/O data inconsistencies between components that have a relationship. For example, a first component may have a defined input format of certain data from a second component which is different than a type of output from the second component. In such instances, the output data may be modified or otherwise changed to ensure that the first and second component can successfully share information that both component can process. In some instances, an API, possibly informed by the I/O data 230, may translate a data type and/or format of data to enable components to exchange compatible information.

At 708, the prototype application 210 may determine timing data 228 for each component and/or for each block of the I/O data 230. The timing data 228 may inform the API module 216, as discussed below. For example, a component simulator may output a series of numbers which may represent navigational controls. This information may be output at a certain time to effectually simulate use of an actual physical navigation controller, which may output signals at standardized intervals, in response to events/triggers, or at other times. The timing data 228 may include initiation trigger information to initiate operation of a component. In some instances, the timing data 228 may include information that defines relationships of at least some of the I/O data 230, such as information needed as an input to be used to generate an output by a particular component. The timing data 230 may provide information, via timing parameters and/or other logic, to coordinate operation of different components or use of outputs of those components, via APIs or other modules.

At 710, the API module 216 may create a new API and/or modify an existing API for each component to enable interoperability between components based on the relationships determined from the operation 704. The API module 216 may use the I/O data 230 and/or the timing data 228 to create or modify the APIs. In some embodiments, the API module 216 may leverage an existing API, such as an API stored in the API library 222 rather than creating a new API. The existing API may be an API used for a different component or may be an API template, which may enable efficient creation of a new API. As discussed above, the APIs may include address information to enable exchanging information between components, format information, parameters, the timing data 228, and/or other data to enable the interoperability between the components managed by each API. In some embodiments, an API may be used for multiple components, such as when components have at least some redundancy (e.g., multiple motors controlled by multiple electronic speed controllers, etc.), or when other efficiencies may be achieved. In various embodiments where hardware components are coupled directly to one another or coupled via a physical bus (e.g., a CAN bus, etc.), then APIs may not be deployed for those components. However, APIs may be used to facilitate data exchange between hardware components such as to modify a type or format of data, modify or specific timing data, and/or for other reasons that may otherwise make operation between two or more hardware components incompatible. Often, these APIs may be executed by the bus, via a protocol or by modification of logic of a physical bus. The creation and/or modification of the APIs may be performed at least in part by an automated process; however, it is contemplated that human input may be used to finalize APIs before use of the API.

At 712, the test and analytics application 212 may execute a test operation by deploying the prototype created via the operations 702-710. In some embodiments, the test protocol 218 may test different scenarios, such as by using at least one component simulator to provide I/O data that mimics a certain scenario or performance task. As an example, a prototype unmanned aerial vehicle (UAV) may use simulated navigation controls to test performance of the prototype system, such as by performing a virtual test flight.

FIG. 8 is a flow diagram of an illustrative process 800 to perform analytics from test data for different configuration of a pluggable hardware simulation test execution. The process 800 is described with reference to the environment 100 and the computing architecture 200.

At 802, the prototype application 210 may create a first prototype model that includes at least some component simulators that simulate operation of an actual hardware component. In some embodiments, the first prototype model may include no actual hardware components. However, the first prototype model may include at least one hardware component, such as a physical bus or other hardware component. The first prototype may be an early stage prototype that can test a proof of concept and/or provide initial information to inform selection of actual hardware for use in subsequent prototypes.

At 804, the test protocol 218 may collect test data from operation of the first prototype model that executes a test scenario. The test data may be at least some of the I/O data exchanged between components during the test. In some embodiments, at least some of the test data may be collected by sensors and/or other data collection devices deployed to measure performance of a test of otherwise determine attributes of a test. For example, data may be collected to measure changes in physical properties, and/or other physical changes performed by a tested prototype that includes a hardware component.

At 806, the prototype application 210 may create a second prototype model that includes at least some component simulators that simulate operation of an actual hardware component and include at least one hardware component. The first prototype may be a mid stage prototype that can test operation of a specific hardware component. For example, the second prototype model may substitute a component simulator with an actual hardware component for use in the test scenario. To add the actual hardware component, the flexible system may be modified by updating one or more APIs to enable interoperability of the actual hardware components with existing component simulators and/or with other hardware components, possibly including a physical bus.

At 808, the test protocol 218 may collect test data from operation of the second prototype model that executes the test scenario. The test scenario may be a same test scenario used to test the first prototype model and create baseline data.

At 810, the analysis module 220 may compare data captured as a result of the operation 804 and as a result of the operation 808 to determine differences in operation, compare operation to baseline data, determine whether a prototype operates as intended, and/or for other purposes. In some embodiments, the tests may allow validation of any portion of a prototype model, including fully-hardware integrated prototypes as well as exclusively software prototypes, and hybrid prototypes that include some hardware components and some component simulators.

By using the repeatable test scenario and enabling reuse of prototype models to create different variations (e.g., using the first prototype model to create the second prototype model, etc.), different iterations of development may be performed more efficiently than creating independent and new models for each stage of development. Further, the testing described in the process 800 may enable isolating performance of a single change, such as to test performance of a hardware component in comparison with a component simulation of the hardware component. Meanwhile, the testing scenario may leverage at least one component simulator to enable execution of the test scenario, such as to enable repeatability of certain inputs/outputs, parameters, and/or other data to is used in the testing scenario.

In various embodiments, the system may be used to prototype and test subcomponents that are used to create a larger working system prototype. For example, a subsystem of an aircraft may include a propulsion system. The propulsion system may be prototyped as discussed herein using at least some component simulators. Later prototypes may include at least some hardware components. The propulsion system may later be added to other subsystems to enable further testing of larger subsystems or of a complete prototype system. Thus, the techniques and systems described herein can be used to test different variations of a system, or test subsets of the system.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method to create a hybrid prototype, the method comprising:
   determining components to be deployed in the hybrid prototype, the components including at least a first component simulator, a second component simulator, and a hardware component;
   determining relationships between the first component simulator, the second component simulator, and the hardware component to create a design model for the hybrid prototype;
   creating an application program interface (API) to facilitate an exchange of input/output (I/O) data and timing data between the first component simulator, the second component simulator, and the hardware component; and executing a test scenario using the hybrid prototype to validate operation of at least one of the first component simulator, the second component simulator, or the hardware component, wherein executing the test scenario comprises:

receiving, at the first component simulator, input data from a computing device;

initiating, based at least partly on the input data, first execution of the first component simulator to provide software simulation of the hardware component;

sending, based at least partly on output data from the first execution of the first component simulator, input to at least one of the second component simulator or the hardware component; and initiating, based at least partly on the input sent to the at least one of the second component simulator or the hardware component, test execution of the at least one of the second component simulator or the hardware component.

2. The method as recited in claim 1, wherein the test scenario is performed by causing at least one of the first component simulator or the second-component simulator to output predetermined data to enable repeatability testing of related prototypes using the test scenario.

3. The method as recited in claim 1, further comprising retrieving at least one of the API, the first component simulator, or the second component simulator from a library that stores prior prototype data or templates used to develop APIs, component simulators, or both.

4. The method as recited in claim 1, wherein test data from the hybrid prototype that performs the test scenario is analyzed by comparing the test data to baseline data captured from a prior iteration of the hybrid prototype.

5. The method as recited in claim 1, wherein a visualization tool configured to receive user input is used to define second relationships between the first component simulator, the second component simulator, and the hardware component.

6. The method as recited in claim 1, further comprising replacing at least one of the first component simulator or the second component simulator with a corresponding hardware component that performs a same or a similar function.

7. The method as recited in claim 1, wherein the first component simulator exchanges data with the hardware component via a controller area network bus or an Ethernet bus.

8. The method as recited in claim 1, wherein the first component simulator executed by software exchanges data with the hardware component via a protocol that simulates a bus to exchange the data.

9. A system comprising:
one or more processors;
a bus; and
memory storing computer executable instructions that, when executed, cause the one of more processors to perform acts to:
receive, at a component simulator, input data from a computing device;
initiate execution of the component simulator to provide software simulation of a first hardware device;
receive, via the bus, a first input from the first hardware device in communication with the bus;
determine a simulation component to process the first input;
determine one or more execution parameters associated with the first input to process the first input by the simulation component;
execute the simulation component to process the first input in accordance with the one or more execution parameters;
disable the simulation component;
receive, via the bus, a second input from the first hardware device in communication with the bus; and
select, via the bus, a second hardware device to process the second input.

10. The system as recited in claim 9, wherein the first input is processed by an application program interface (API) to add or modify at least one of the one or more execution parameters.

11. The system as recited in claim 9, wherein the one or more execution parameters include at least one of timing information, input/output data, or a format of the first input.

12. The system as recited in claim 9, wherein the one or more processors further perform acts to compare first test data associated with first performance of the second hardware device to second test data associated with second performance of the simulation component.

13. The system as recited in claim 9, wherein the one or more processors further perform acts to:
receive a first output from the simulation component;
send the first output to an analytics component; and
process the first output using the analytics component to compare the first output to a second output associated with at least one of a different hardware device or a different hardware simulation device.

14. The system as recited in claim 9, further comprising a design model that defines relationships between the first simulation component and second simulation component, the design model being modifiable to enable substitution of at least one of the first simulation component or the second simulation component with corresponding physical hardware that performs a same or a similar function as the first simulation component or the second simulation component.

15. The system as recited in claim 14, further comprising an interface module stored in the memory and executable to provide visualization of the design model.

16. The system as recited in claim 15, wherein the design model defines relationships between at least one of the first hardware device, the second hardware device, or the simulation component.

17. A method comprising:
initiating execution of a first component simulator that provides software simulation of a hardware component;
sending output data from the first component simulator to a second component simulator as input to the second component simulator;
sending the output data from the first component simulator to a physical hardware component that performs a same or a similar function as the second component simulator; and
initiating execution of at least the second component simulator or the physical hardware component.

18. The method as recited in claim 17, wherein the output data is sent to the second component simulator or the physical hardware component using a physical bus or a simulated bus implemented using a software protocol.

19. The method as recited in claim 17, further comprising an editor to enable receipt of input to modify parameters of the output data.

20. The method as recited in claim 19, wherein the parameters include at least timing information and a format of the output data.

\* \* \* \* \*